June 27, 1961   J. REPASKY ET AL   2,990,069
PALLET HANDLING AND CONVEYING APPARATUS
Filed Oct. 30, 1956   4 Sheets-Sheet 3

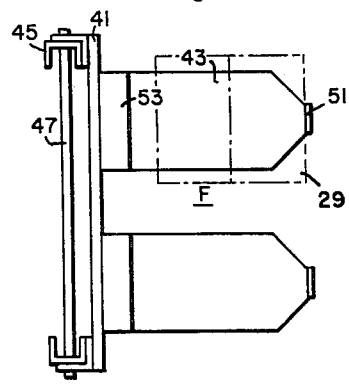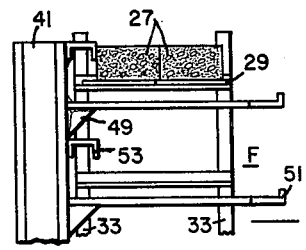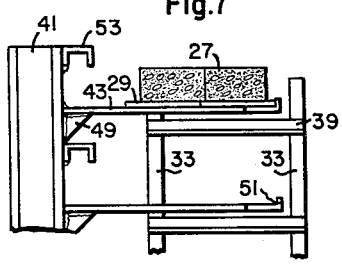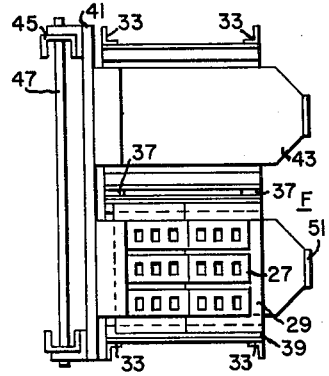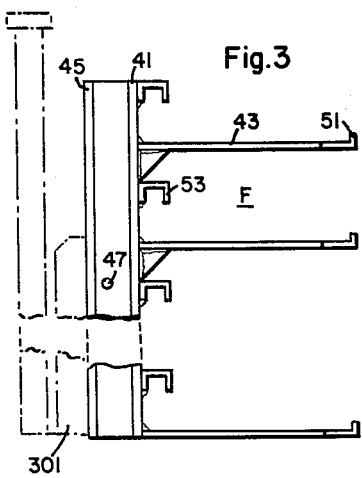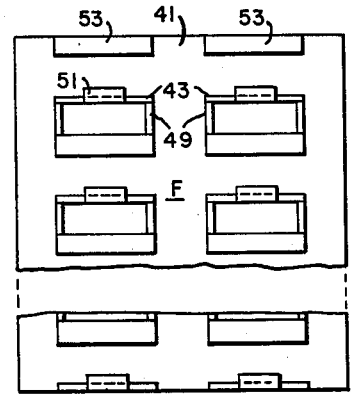

United States Patent Office 2,990,069
Patented June 27, 1961

2,990,069
PALLET HANDLING AND CONVEYING
APPARATUS
Joseph Repasky and George Repasky, Greensburg, Pa.,
assignors to Greensburg Concrete Block Company,
Greensburg, Pa., a corporation of Pennsylvania
Filed Oct. 30, 1956, Ser. No. 619,247
12 Claims. (Cl. 214—6)

This invention relates to the art of making building blocks, such as molded blocks of concrete or the like, and has particular relation to methods and apparatus for handling the blocks after they are made.

Block making apparatus, in accordance with the teachings of the prior art, is typified by Corwin Patent 2,586,-210. Corwin discloses a machine in which wet concrete is molded into blocks. This machine consists of a mold on one side of which there is a magazine into which pallets are deposited. A pallet is a sheet or plate of steel usually of rectangular shape, particularly suitable for holding the blocks. The pallets are fed into the molding part of the machine one by one and on each pallet a plurality of wet molded blocks are deposited. The loaded pallet is then advanced to a platform on the other side of the machine from the magazine. The wet blocks being saturated with moisture are heavy and the molding operation is followed by a drying or curing operation to remove the moisture.

The block-loaded pallets delivered on the platform of the machine are loaded usually with the aid of a hydraulic lift into racks or carriers. A typical rack or carrier is shown in the Besser Patent 2,692,418. Briefly described, a rack consists of a plurality of angle-strip columns serving as a supporting frame in which there are a plurality of sets of tracks formed by angle strips vertically spaced along the columns. The block-loaded pallets are deposited on the tracks of the rack and, in effect, constitute loaded shelves on the rack. There are usually two loaded pallets on each pair of tracks of the rack. The blocks are heavy with moisture, and the tracks and the shelves on them must be properly supported by the columns and by braces. The blocks are cured or dried while loaded on the racks by circulating heated air around them, and the individual blocks on each pallet are separated a short distance as shown in FIG. 1 of the Corwin patent, and the groups of blocks on the pallets on each shelf of the rack are also separated to permit circulation of the air.

After the blocks are dried the rack is removed from the kiln to a yard where the blocks are to be stacked for shipment. At this point the blocks may be stacked by a cuber. This cuber is an air or hydraulically actuable tool in the form of a clamp having arms between which a group of blocks may be gripped, raised from the rack and stacked. After a rack is unloaded, it is moved back to a position adjacent the magazine on the machine (see Corwin FIG. 1, 115) where the pallets on the rack are deposited in the magazine with the aid of an air or hydraulic lift. The empty rack must then be returned to the platform of the machine for further loading.

One disadvantage of the prior art apparatus is that the cuber or any like apparatus can remove only the blocks on one of the pallets on any shelf on the rack during each operation. Because of the presence of the supporting columns and the bracings of the rack the cuber cannot be set to embrace the groups of blocks on several pallets on the same shelf.

It is, accordingly, an object of this invention to provide a method of block-handling which shall permit the removal of more than one group of blocks from pallets on the same shelf of a block-handling rack.

An ancillary object of this invention is to provide a tool for facilitating the removal of more than one of the groups of blocks from the shelves of a block-handling rack.

Another ancillary object of this invention is to provide a tool to operate in combination with a block-handling rack which shall so arrange the blocks on the pallets in the same plane on the rack as to facilitate the stacking of these blocks as a unit.

Another disadvantage of the prior-art apparatus resides in the difficulty and the time consumed in depositing the pallets from an empty rack in the magazine of the molding machine for further use and the returning of the racks for further loading, and it is another object of this invention to reduce the cost of the labor and the time consumed in unloading the pallets from the racks.

More specifically, it is another object of this invention to provide a method for handling blocks in the practice of which the empty pallets shall be deposited in the magazine of the molding machine in a relatively short time and without excessive labor cost.

A more specific object of this invention is to provide a novel conveyor system for depositing pallets.

Another object of this invention is to provide a pallet conveyor system for depositing pallets in the magazine of a molding machine which shall be particularly adapted to cooperate with the block removing tool, in accordance with this invention.

In accordance with one of the specific aspects of this invention a pallet receiving fork is provided. This fork includes a vertical back support from which are suspended as cantilevers vertically spaced sets of a plurality of tongues or platforms or shelves. The fork is to be used in cooperation with the racks and its tongues correspond in number and disposition to the number of tracks or shelves of the rack with which the fork is to cooperate. The fork is adapted to be interlinked with a loaded rack and when so interlinked the tongues of the fork extend under and engage the pallets on each horizontal level of the rack. At the end of each tongue of the fork there are hook-like projections or lips which engage the inner edge of the inner pallet on a shelf when a fork tongue is disposed in engagement with a pallet on a rack. Above each tongue a bracket is secured to the back support. This bracket is spaced a short distance above the tongue.

As each tongue is moved into the rack during the interlinking, the bracket displaces the group of blocks nearest this bracket towards the other blocks so that the groups of blocks are moved together and the removal of the blocks from the forks as a unit by the cuber is permitted. After a fork is interlinked with a rack and each of its tongues engages the pallets on the rack, the fork is moved outwardly from the rack and the pallets with their load of blocks are transferred to the tongues of the fork. Since the platforms of the fork are open, the blocks are readily removed from it by the clamp of a cuber such as is shown in Besser Bulletin 98.

In accordance with a further aspect of this invention, a method is provided, in the practice of which the loaded pallets are transferred from the rack to the fork after the rack is removed from the drying kiln. Since the moisture is at this point removed from the blocks, the fork need not be excessively bulky to support the blocks and pallets. The blocks are then removed from the pallets on the tongues by a cuber and stacked and the pallets are unloaded into a conveyor system by means of which they are fed into the magazine of the machine.

In accordance with a further specific aspect of this invention, a conveyor system for the pallets is provided. This system includes a plurality of pallet unloading channels. The channels correspond in number to the number of parallel tongues on the pallet receiving fork. Where there are two sets of parallel tongues, there are two pallet unloading channels. The pallets unloaded in each channel are moved through the channel by a belt or equivalent mechanism into a magazine associated with the channel. The magazines of the channels are displaced along the direction of movement of the pallets by a distance approximately equal to the length of the pallet along the direction of movement. A conveyor is cooperatively associated with the magazines. The conveyor is so disposed as to move pallets deposited on it at right angles to their direction of movement in the channels. The individual pallets are moved by a chain from the magazines onto the conveyor in staggered relationship. The conveyor feeds into a channel through which the pallets are deposited in the magazine of the block making machine.

The novel features considered characteristic of this invention are described generally above. The invention, itself, both as to its organization and its method of operation, together with additional objects and advantages thereof, will be understood from the following description of specific embodiments when read in connection with the accompanying drawings, in which:

FIG. 2 is a plan view of a pallet receiving fork in accordance with this invention;

FIG. 3 is a view in side elevation of the fork shown in FIG. 2;

FIG. 4 is a view in front elevation of the fork shown in FIG. 2;

FIG. 5 is a fragmental view in side elevation showing the interlinking of tongues of the fork and shelves of the rack;

FIG. 6 is a plan view showing the fork and a rack interlinked;

FIG. 7 is a fragmental view in side elevation showing a loaded fork being removed from a rack;

Description

Figure 1:
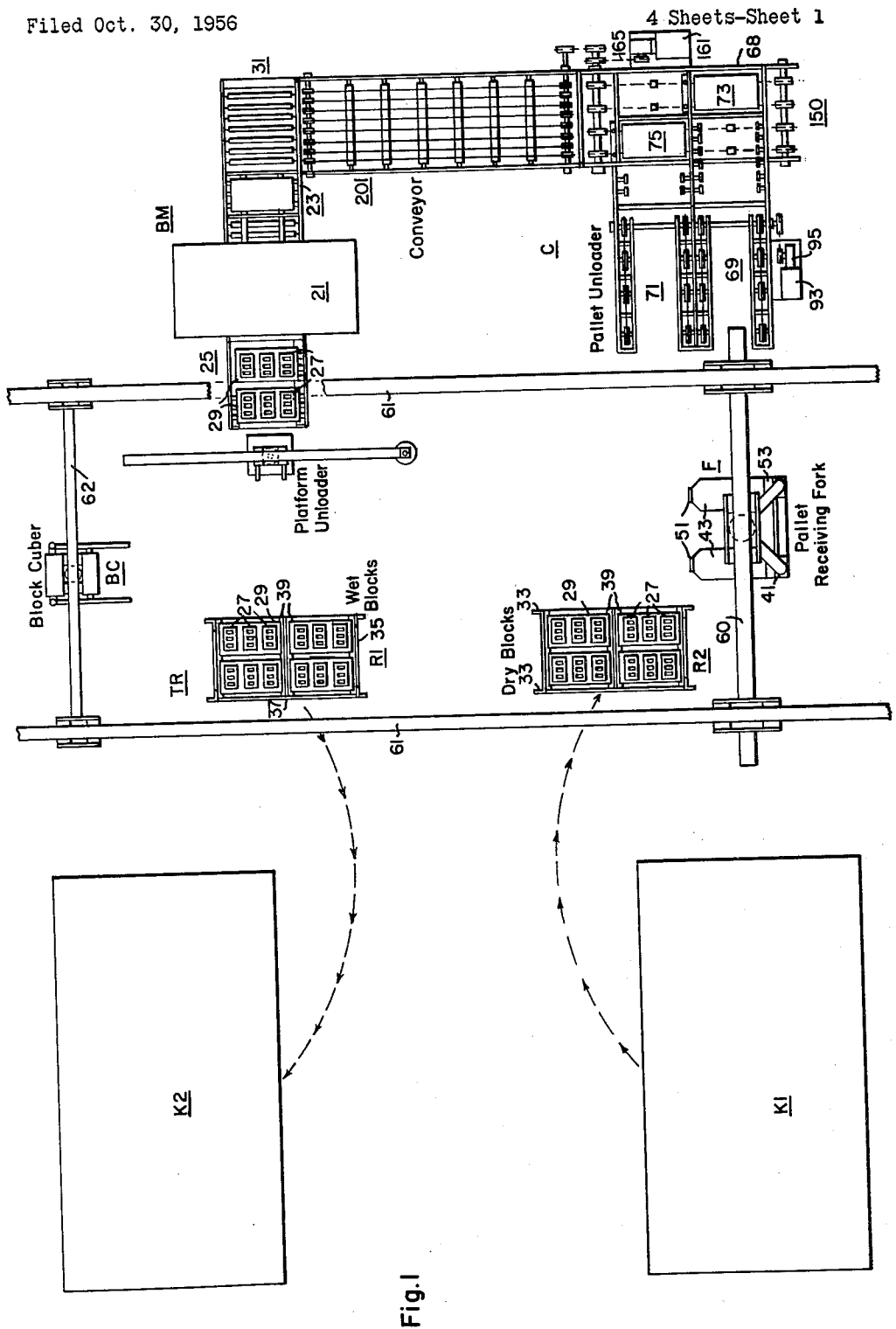
FIGURE 1 is a diagrammatic view showing the essential structural features of this invention and also serving to illustrate the practice of the method in accordance with this invention.

The apparatus shown in FIG. 1 includes a block making machine BM, a plurality of racks or braced carriers R1 and R2, a plurality of curing kilns K1 and K2, a pallet receiving fork or cantilever carrier F, an overhead track system TR for moving the various components from one position to another, and a pallet conveyor system C. The machine BM includes a molding mechanism 21, not shown in detail, on one side of which there is a pallet magazine 23 and on the other side of which there is a platform 25 to which molded blocks 27 are delivered on the pallets 29. Where standard building blocks are being molded, three blocks 27 are usually delivered on each pallet 29. The blocks on the pallets are spaced as shown in FIG. 1. The pallet magazine 23 is fed through a magazine supply channel 31 which is connected to the conveyor system C.

Each of the racks R1 and R2 consists of a plurality of angle columns 33, 35 and 37 between which vertically spaced angle iron tracks 39 extend. The columns 33 at the four corners of the rack extend below the intermediate columns 37 and serve as legs (not shown) for the racks R1 and R2. These columns may be provided with wheels or casters, or facilities for mounting on a tote truck may be provided. Loaded pallets 29, as shown in FIGS. 1, 5, 6, 7, may be slid onto the tracks 39 as shelves.

The pallet receiving fork F is shown in detail in FIGS. 2 through 7. This fork includes a vertical back support 41 from which pallet receiving tongues 43 are suspended cantilever fashion vertically spaced. The support 41 is a plate of C section having channel strips 45 welded to its ends. A supporting rod 47 extends through the strips 45 secured thereto at its ends. The tongues 43 are welded to the plate 41 and are also welded to gussets 49 which are themselves welded to plate 41. Each of the tongues 43 is tapered at the end remote from the vertical support 41 and is provided with an upwardly extending lip or hook 51 at the end. Above each tongue 43 a strip of channel section 53 is mounted. The strip 53 is at a distance from the tongue which is substantially less than the height of a pallet 29 plus a block 27 placed on the tongue. The width of each tongue is preferably less than the width of the pallets to be disposed on the tongue so that the pallets overhang the edges of the tongues. (FIG. 2.)

The number of rows of tongues 43 on any pallet receiving fork F and their horizontal and lateral spacing corresponds both to the number of rows of tracks 39 and the spacing between the tracks on the rack R1, R2 with which the pallet receiving fork is to cooperate and corresponds as well with the centerline to centerline distances between corresponding channels 69 and 71. In the fork F, shown in FIGS. 2 through 7, there are two rows of tongues 43. This fork F is adapted to be used with a rack R1, R2 in which there are two rows of tracks 39, each row of tracks having a number of pairs of tracks 39 equal to the number of tongues 43 in each row of tongues.

The track system TR may be of any type available in the art. The system includes a plurality of tracks 60, 61 and 62, the tracks 60 and 62 being movable along the tracks 61. The pallet receiving fork F is suspended from the tracks 60 in such manner that it may be moved along the tracks 60. The fork is pivotally mounted so that it may be turned at any desired angle. The mounting also includes an air or hydraulic cylinder or other device permitting the fork F to be raised or lowered. A block cuber BC is suspended from the tracks 62. This cuber may be of any type available in the art; it is movable along the tracks 62 so that it may cooperate with a fork F.

Figure 8:
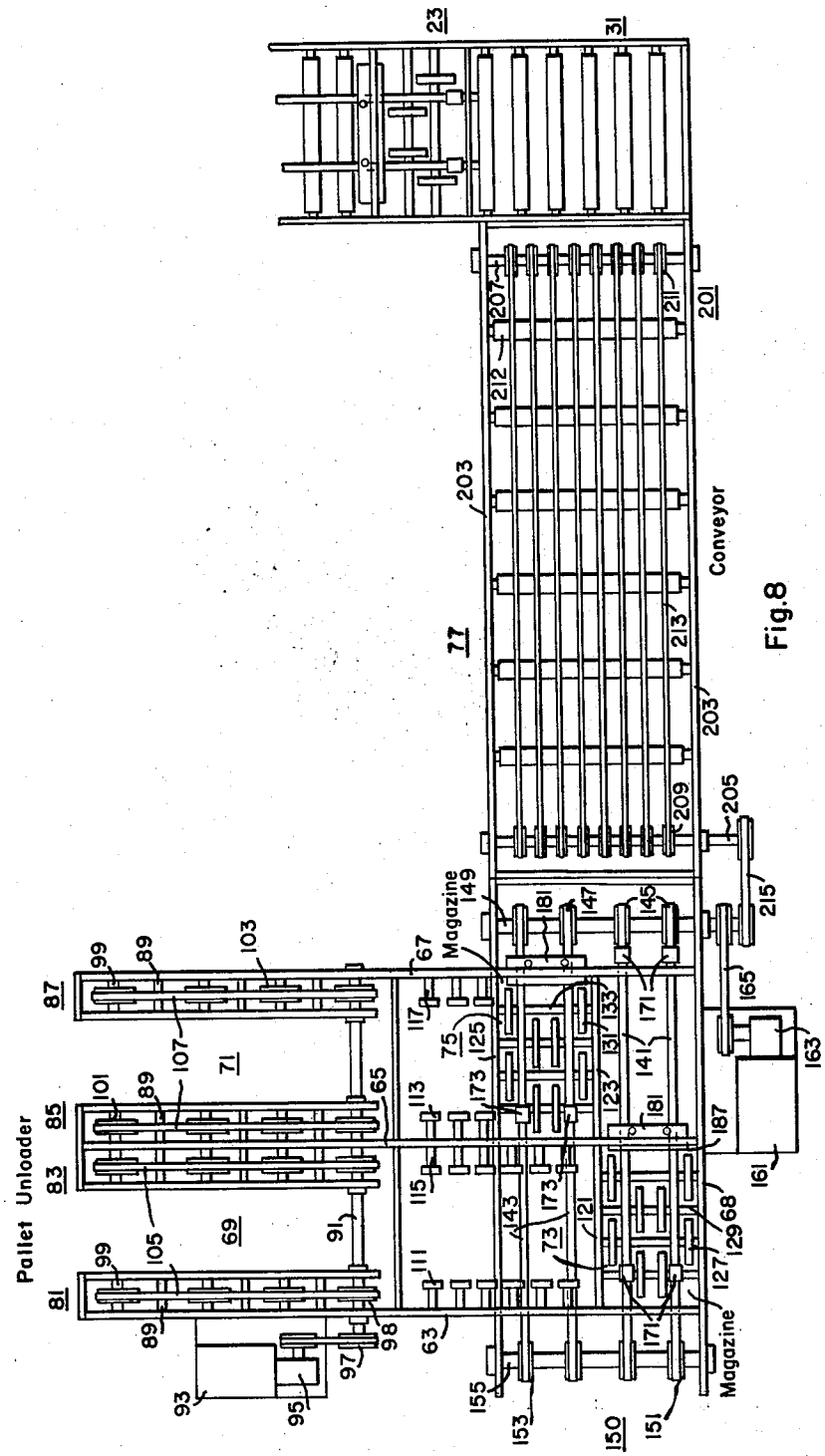
FIG. 8 is a plan view of the pallet conveyor system in accordance with this invention.
Figure 9:
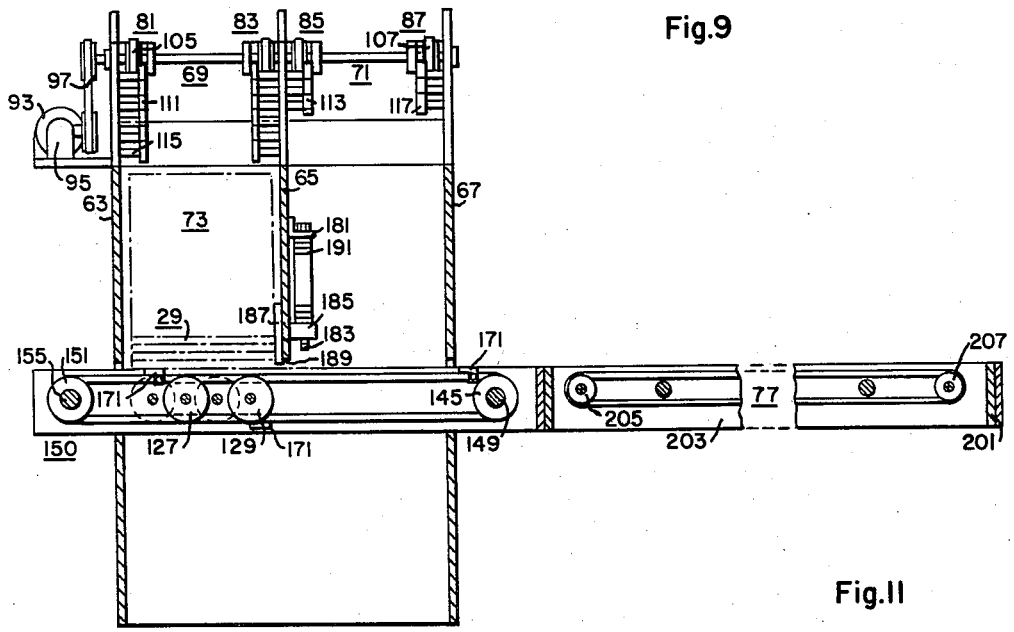
FIG. 9 is a view in side elevation with certain parts cut away of the conveyor system shown in FIG. 8.
Figure 10:
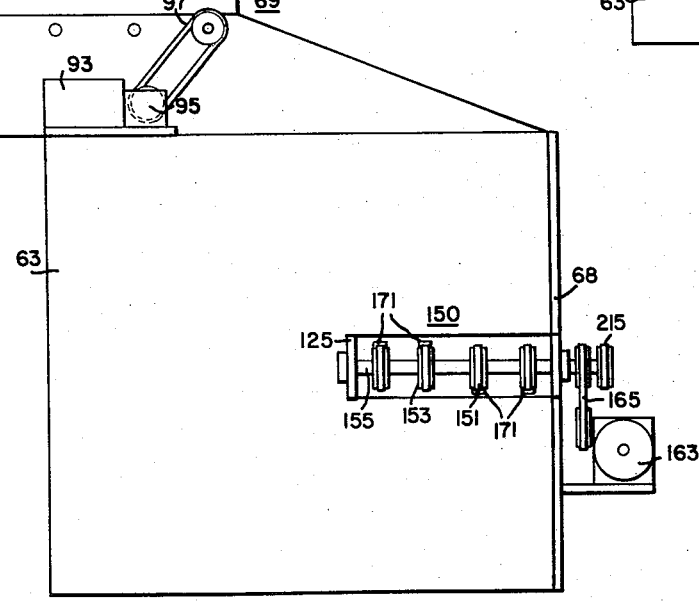
FIG. 10 is a view in end elevation of the conveyor system shown in FIG. 8.

The conveyor system (FIGS. 8, 9, 10) includes a plurality of vertical supporting plates 63, 65 and 67 on which a plurality of pallet unloaders or unloading channels 69 and 71, and associated magazines 73 and 75 are mounted. Each unloader 69 and 71 is in communication with a magazine 73 and 75 which are in turn in communication with the pallet conveyor 77.

Each pallet unloader 69 and 71 includes a pair of brackets 81 and 83 and 85 and 87 mounted on spacers 89 extending from the adjacent plates 63, 65 and 67, respectively. A drive shaft 91 common to the unloaders 69 and 71 extends through the brackets 81 through 87 and the plates 63 through 67 and is journalled for rotation in the plates 63 and 67. The shaft 91 is driven from a motor 93 through a reduction gearing unit 95 and a belt 97. The shaft carries drive pulley wheels 98. A plurality of pins 99 and 101 are secured in the brackets 81 and 87 and 85, respectively, parallel to the shaft 91. Each of the pins 99 and 101 carries a V-groove pulley wheel 103 rotatable about it. The wheels 103 carry V-belts 105 and 107. The V-belts 105 and 107 move in a substantially horizontal plane.

The channels 69 and 71 also include rows of idler rollers 111 and 113 which are mounted rotatably on pins 115 and 117 extending from the plates 63 and 65 and 65 and 67. The rollers 111 are coextensive with the V-belts 105 and the rollers 113 with the V-belts 107 so that pallets on the V-belts 105 and 107 are transferred respectively to the rollers 111 and 113. The pins 115 and 117 are arrayed in rows inclined to the horizontal so that the pallets projected onto the rollers 111 and 113 move under gravity along the rollers. The rows of rollers 111 are longer by a distance equal to the length of the pallets along the direction of movement of the V-belts 105 and 107 than the rows 113.

Each of the roller rows 111 and 113 communicates respectively with a magazine 73 and 75. Each of the magazines 73 and 75 is a box-like container open at the top and bottom. The magazine 73 is defined by the plates 63, 65 and 68 and a cross plate 121 and the magazine 75 by plates 65 and 67 and cross plates 123 and 125. A plurality of rollers 127 on pins 129 supported between the plates 121 and 68 extend a short distance into magazine 73. Similarly, a plurality of rollers 131 and pins 133 extend into the magazine 75. The rollers 127 and 131 serve to support the pallets 29 in the magazines 73 and 75. The magazines open into the exit ends of the rollers 111 and 113, the magazine 73 being supplied by one of the pallet unloading channels 69 being displaced with reference to the magazine 75 associated with the other pallet unloading channels 71 in the direction of movement of the pallets 29 by a distance equal to the length of the pallets along the direction of movement through the channels.

A pair of chain belts 141 and 143 is movable along the open bottom of each magazine 73 and 75. These chain belts 141 and 143 are driven by sprocket wheels 145 and 147 on a common shaft 149 journalled in bearings near one end of a bracket 150 secured to the plates 63, 65, 67 and pass over idler sprocket wheels 151 and 153 on a shaft 155 near the other end of the bracket 150. The shaft 149 is driven by a motor 161 through reduction gearing 163 and a belt 165.

Each of the chains 141 and 143 carries pairs of pusher lugs 171 and 173, each pair of pusher lugs 171 and 173 on each pair of chains being aligned and each aligned pair of pusher lugs 171 on one pair of chains 141 being displaced by the length of the pallets along the direction of movement of the chains with reference to an associated aligned pair of lugs 173 on the other pair of chains 143. The lugs extend into the magazines 73 and 75 so that each pair can engage the edge of the bottom pallet 29 in the magazine and move it with the chains (141 or 143).

A gate is provided on the exit wall 65 and 67 of each magazine 73 and 75 in the direction of movement of the associated chains 141 and 143. This gate includes a cross angle strip 181 suspended from the wall 65 and 67. A plurality of bolts 183 extend through openings in one of the sides of this strip 181. The bolts 183 support a pair of stud blocks 185 which carry a plate 187. The plate 187 is held against the magazine side of plates 65 and 67 (respectively), the stud block 185 extending through a slot in the plate 65 or 67 which permits upward or downward adjustment of the stud block 185. The plate 187 overlaps the lower edge 189 of the plate 65 or 67. The overlap may be set by inserting washers 191 between the lower side of the angle 181 and the stud block 185 along the bolts 183. Thus, the distance of the plate 187 from the supporting region of the magazine 73 or 75 may be adjusted, and the opening may be maintained such that only one pallet 29 can pass through at a time.

The conveyor 77 includes a frame bracket 201, the sides 203 of which serve to support bearings for a drive shaft 205 at one end and an idler shaft 207 at the other end. The shafts 205 and 207 carry a plurality of V-groove pulleys 209 and 211 over which belts 213 pass. The drive shaft 207 is driven from the motor 161 through a belt 215. Between the pulleys 209 and 211 there are a plurality of idler rolls 219 over which the V-belts pass.

The conveyor frame 201 is bolted to the bracket 150. The conveyor 77 is connected at its delivery end to the channel 31 which feeds the magazine 23 of the block making machine BM. While in the apparatus shown the conveyor 77 is horizontal, it may be inclined to suit the position of the channel 31. If the channel is above the level of the magazines 73 and 75 associated with the pallet unloading channel, the conveyor 77 may be inclined upward; if the channel 31 is below this level, the conveyor 77 may be inclined downward.

*Operation*

In the practice of the invention, a rack R1 which is loaded with wet blocks 27 at the machine BM is moved to a curing kiln K2, by an attendant. The attendant, when he deposits the rack R1, may remove a rack R2 with dry blocks from the kiln and deliver it to a position adjacent the pallet receiving fork F. The pallet receiving fork F is then interlinked with the rack R1 from the open front side of the rack R1. Each of tongues 43 of the pallet receiving fork F is moved under a corresponding shelf 27—29 of the rack, assuming a position just under the corresponding shelf of the rack (FIG. 5). As the fork F is moved inward, the blocks 27 on the outer pallets 29 in the rack R1 are moved towards the blocks 27 on the inner pallet 29 so that the blocks 27 form an integrated group of blocks. The pallet receiving fork F is then raised to the position shown in FIG. 7 and retracted. As the fork is retracted, the lip or hook 51 at the end of each tongue 43 engages the inner edge of the adjacent pallet and the loaded pallets on the rack shelf are transferred to the fork tongues. Preferably the rack R1 is unloaded near the platform 25 of the machine BM and once unloaded is ready for another loading. If the rack R1 is unloaded remotely from the machine BM, it may be returned adjacent to the receiving platform 25 of the block making machine BM for a further operation.

The now loaded fork F is moved to a position adjacent a block cuber BC where the blocks may be removed. All of the blocks 27 on each of the pallet receiving tongues 43 may be handled together. Thus, in the situation illustrated, six blocks instead of three may be removed with the aid of the block cuber. Where the racks carry more than six blocks on each shelf, the fork F and cuber may be correspondingly modified. In addition, the blocks 27 are more readily accessible in the fork F than they are in the racks R1 and the removal is expedited. Thus, there is a substantial saving in time and labor. The blocks 27 are stacked by the cuber.

After the blocks 27 have been removed from the pallets 29 on the pallet receiving fork F, the fork F is moved to a position adjacent the pallet unloading channels 69 and 71 and turned to a position permitting the pallets to be deposited on the V-belts 105 and 107 of the pallet unloading channels. In unloading the pallets 29 each set of tongues 43 of the fork F are raised above the channels 69 and 71, positioned over the belts 105 and 107 in the channels and then lowered so that the belts 105 and 107 engage the overhanging edges of the pallets 29 on the tongues 43 (see FIG. 2). The belts then remove the pallets from the tongues. For this purpose the belts 105 and 107 should be so spaced as to permit the tongues 43 to be inserted between them but to engage the edges of the pallets 29 on the tongues. The pallets 29 on the tongues 43 are successively deposited on the V-belts 105 and 107 of the pallet receiving channels and are carried by the V-belts into the associated magazines 73 and 75. The pallets are stacked in the magazines, the staggered rollers 127 and 131 at the base of the magazines bearing the weight. The pallets 29 so stacked may be transferred one at a time by the transfer chains 141 and 143 to the conveyor 77. The pusher lugs 171 and 173 on the chains are displaced by a distance equal to the length of the pallets 29 along the direction of movement of the chains 141 and 143 and thus the pallets are fed alternately in staggered relationship to the belts 213 of the conveyor 77. The conveyor moves the pallets into the channel 31 leading to the magazine 23 at the rear of the block making machine BM. The pallets are delivered to this channel in staggered relationship so that they may be moved uniformly into the magazine 23. Once the pallets are moved into the magazine 23 they are transferred to the mold 21 of the block making machine to receive additional blocks.

Conclusion

The above disclosed invention includes within its scope a novel method of handling building blocks and the pallets on which they are transported. In addition, there is a novel pallet receiving fork and a novel pallet conveying system which facilitates the transfer of the pallets from their loaded positions on the rack to the magazine of the block making machine where they are ready for another operation.

Figure 11:
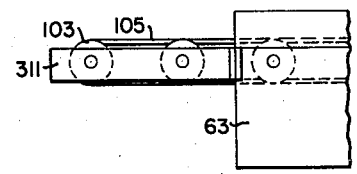
FIG. 11 is a fragmental view showing a modification of the invention.

The use of the conveyor system C in combination with the pallet receiving fork F as disclosed above is highly advantageous involving substantial labor saving. Under certain circumstances where a fork is not available, the pallet conveyor system C may be used directly to transfer pallets on a rack (R1 or R2) into the magazine 23 of the block making machine BM. Under such circumstances, the rack is disposed in such a position relative to the pallet unloading channels 69 and 71 of the conveyor system that the pallets are deposited in these channels and transferred through these channels into the magazine of the block making machine. In this case, the channels 69 and 71 should be modified to include overhanging brackets 311, as shown in FIG. 11, so that the rollers 103 and belts 105 and 107 extend out from the plates 63, 65, 67, permitting the belts to engage the pallets in the rack shelves without obstruction from the plates 63, 65, 67. The racks are in this case carried by a fork lift. The lift lowers each horizontal set of the pallet shelves in its turn on the belts 105 and 107. Once a set of shelves is deposited on the belts 105 and 107 the lift drops the racks so that the corresponding angle iron tracks 39 (FIG. 7) are well below the belts and the belts remove the pallets.

The pallet receiving fork F disclosed herein is movable along a track. The fork may also be moved by means of a tote truck. The supporting portion 301 of such a truck is shown in broken lines (in FIG. 3). When using a tote truck for the pallet receiving fork, the loaded rack may be delivered near the stacking area by a tote truck. The fork F on another truck may then be interlinked with the rack and the loaded pallets transferred to the fork. The fork may then be unloaded with a cuber and returned to the conveyor system for unloading the pallets.

While specific embodiments of this invention have been disclosed herein, many modifications thereof are feasible. The invention, therefore, is not to be restricted except insofar as is necessitated by the spirit of the prior art.

We claim as our invention:

1. A conveyor system for pallets on which are deposited blocks made in a block-making machine having a magazine, said pallets to be deposited in said magazine, said system comprising in combination, a first pallet-unloading channel, a second pallet unloading channel, each said channel including means for advancing pallets unloaded thereon, said pallets being advanced by said channels in parallel lines along the direction of their length, a magazine connected to each channel to receive the pallets advanced thereby, said magazine connected to said second channel being displaced by the distance of the length of one pallet along the direction of movement in the direction from which said pallets are advanced with reference to the magazine connected to said first channel, a conveyor disposed to advance pallets to the magazine of the block making machine in a direction at an angle to said channels along the direction of the width of said pallets, first means connected to the magazine connected to said second channel for delivering pallets therein to said conveyor, and second means connected to the magazine connected to said first channel for delivering pallets therein to said conveyor, means interconnecting said first and second delivering means so that said pallets from said respective magazines are delivered in staggered relationship to said conveyor, said conveyor being spaced from the magazine connected to said second channel a greater distance than from said magazine connected to said first channel by approximately the length of each pallet along the direction of movement of said conveyor, and said pallets being unloaded from said magazines connected to said channels in staggered relationship.

2. A conveyor system for pallets on which are deposited blocks made in a block-making machine having a magazine, said pallets to be deposited in said magazine, said system comprising in combination, a first pallet-unloading channel, a second pallet-unloading channel, each said channel including means for advancing pallets unloaded thereon, said pallets being advanced by said channels in parallel lines along the direction of their length, a magazine connected to each channel to receive the pallets advanced thereby, said magazine connected to said second channel being displaced by the distance of the length of one pallet along the direction of movement in the direction from which said pallets are advanced with reference to the magazine connected to said first channel, a conveyor disposed to advance pallets to the magazine of the block making machine in a direction at an angle to said channels along the direction of the width of said pallets, first means connected to the magazine connected to said second channel for delivering pallets therein to said conveyor, and second means connected to the magazine connected to said first channel for delivering pallets therein to said conveyor, means interconnecting said first and second delivering means so that said pallets from said respective magazines are delivered in staggered relationship to said conveyor, said conveyor being spaced from the magazine connected to said second channel a greater distance than from said magazine connected to said first channel by approximately the length of each pallet along the direction of movement of said conveyor, and said pallets being unloaded from said magazines connected to said channels in staggered relationship, said first and second means each including gate means cooperative with the associated magazine and on the side of said associated magazine through which said pallets pass to said conveyor for causing said pallets to be delivered one at a time to said conveyor.

3. A conveyor system for pallets on which are deposited blocks made in a block making machine having a magazine, said pallets to be deposited in said magazine, said system comprising in combination, a first pallet-unloading channel, a second pallet-unloading channel, each said channel including means for engaging the overhanging edges of pallets on the tongue of a pallet receiving fork disposed therein, for disengaging said pallets from said tongue and for advancing pallets unloaded thereon, means for advancing said pallets in said channels in parallel lines along the direction of their length, a magazine connected to each channel to receive the pallets advanced thereby, said magazine connected to said second channel being displaced by the distance of the length of one pallet along the direction of movement in the direction from which said pallets are advanced with reference to the magazine connected to said first channel, a conveyor disposed to advance pallets to the magazine of the block making machine in a direction at an angle to said channels along the direction of the width of said pallets, first means connected to the magazine connected to said second channel for delivering pallets therein to said conveyor, and second means connected to the magazine connected to said first channel for delivering pallets therein to said conveyor, means interconnecting said first and second delivering means so that said pallets from said respective magazines are delivered in staggered relationship to said conveyor, said conveyor being spaced from the magazine connected to said second channel a greater distance than from said magazine connected to said first channel by approximately the length of each pallet along the direction of movement of said conveyor, and said pallets being unloaded from said magazines connected to said channels in staggered relationship.

4. A conveyor system for pallets to be deposited in the magazine of a block-making machine said pallets being delivered in a parallel array including a plurality of pallets, said system comprising in combination a plurality of adjacent pallet unloading channels each including means for advancing pallets unloaded therein, said channels extending from a first channel bounding said plurality on one side to a last channel bounding said plurality on the opposite side, said channels being spaced to correspond to the spacing of said pallets, a magazine connected to each channel to receive the pallets advanced thereby, said magazines being connected in their channels in sequentially increasing spacing with respect to the magazine connected to said first channel in increments of approximately the length of one pallet along the direction from which the pallets are advancing, a conveyor movable in a direction at an angle to said channels, and adapted to be connected to said magazine of said machine to deposit pallets therein, and means connected to said magazines connected to said channels for transmitting the pallets in each said last-named magazine to said conveyor, and means interconnecting the transmitting means for each of said last-named magazines for advancing the pallets in said last-named magazines in staggered relationship to said conveyor.

5. A conveyor system for pallets on which are deposited blocks made in a block-making machine having a service magazine, said pallets to be deposited in said magazine, said system comprising in combination, a first pallet-unloading channel, a second pallet unloading channel, each said channel including means for advancing pallets unloaded therein, said pallets being advanced by said channels in parallel lines along the direction of their length, a magazine connected to each channel to receive the pallets advanced thereby, said magazine connected to said second channel being displaced by the distance of the length of one pallet along the direction of movement in the direction from which said pallets are advanced with reference to the magazine connected to said first channel, a conveyor connected to the magazine of said block-making machine and disposed to advance pallets to said magazine of the block-making machine in a generally lateral direction with respect to said channels, first means connected to the magazine connected to said second channel for delivering pallets therein to said conveyor, and second means connected to the magazine connected to said first channel for delivering pallets therein to said conveyor, means interconnecting said first and second delivering means so that said pallets from said respective magazines are delivered in staggered relationship to said conveyor, said conveyor being spaced from the magazine connected to one of said channels a greater distance from said magazine connected to said other channel by approximately the length of each pallet along the direction of movement of said conveyor, and said pallets being unloaded from said magazines connected to said channels in staggered relationship.

6. A conveyor system for pallets to be deposited in the service magazine of a block-making machine said pallets being delivered in a parallel array including a plurality of pallets, said system comprising in combination a plurality of parallel adjacent pallet unloading channels each including means for advancing pallets unloaded therein, said channels extending from a first channel bounding said plurality on one side to a last channel bounding said plurality on the opposite side, said channels being laterally spaced to correspond to the distance separating the pallets of the parallel array, a magazine connected to each channel to receive the pallets advanced thereby, said last mentioned magazines being connected in their respective channels at different positions longitudinally of the channels, a conveyor movable in a direction generally lateral to said channels, and connected to said magazine of said machine to deposit pallets therein, means connected to said magazines connected to said channels, for transmitting the pallets in each of said last-named magazines to said conveyor, and means interconnecting the transmitting means for each of said last-named magazines for advancing the pallets in said last-named magazines in staggered relationship to said conveyor, the positioning of said last-named magazines in their respective channels being such that each magazine is coextensive with a transverse portion of transverse section of said conveyor so that said pallets from different magazines are advanced in separate generally parallel paths along said conveyor.

7. A conveyor system for pallets to be deposited in the service magazine of a block-making machine, said pallets being deliverable in pairs, comprising in combination first pallet unloading channel means, second pallet unloading channel means, said first and second channel means being spaced to correspond to the spacing of the pallets of said pairs so that a pallet of a pair is unloaded on each channel, each of said channel means including means for advancing pallets unloaded thereon, said pallets being advanced in a first direction in parallel lines by said channel means, a first pallet receiving magazine for storing pallets in vertically spaced relationship connected to said first channel means to receive the pallets advanced by its corresponding advancing means, a second pallet receiving magazine for storing pallets in vertically spaced relationship connected to said second channel means to receive the pallets advanced by its corresponding advancing means, one of said magazines being displaced with reference to the other along said direction of movement of said pallets by a distance of the order of one pallet, means connected to said magazines for advancing the pallets received thereby in a direction generally laterally to said first direction, said last-mentioned advancing means including means synchronizing the movement of said pallets from said first and second magazines for advancing said pallets in staggered relationship, and means connected to said last-mentioned advancing means for transferring said staggered pallets to said magazine of said block-making machine.

8. A conveyor system for pallets to be deposited in the service magazine of a block-making machine, said pallets being deliverable in pairs comprising in combination first pallet unloading channel means, second pallet unloading channel means, said channel means being spaced to correspond to the spacing of the pallets of said pairs so that a pallet of a pair is unloaded on each channel means, each of said channel means including means for advancing pallets unloaded thereon, said pallets being advanced in a first direction in parallel lines by said channel means, a first pallet receiving magazine connected to said first channel means to receive and store in vertically spaced relationship the pallets advanced by its corresponding advancing means, said magazine storing a plurality of said pallets, a second pallet receiving magazine connected to said second channel means to receive and store in vertically spaced relationship the pallets advanced by its corresponding advancing means, said second magazine storing a plurality of said pallets, one of said magazines being displaced with reference to the other along said direction of movement of said pallets by a distance of the order of one pallet, means connected to said magazines for advancing the pallets stored by each, one by one in a direction generally laterally to said first direction, said last-mentioned advancing means including means synchronizing the movement of said pallets from said first and second magazines so that the respective pallets are advanced from said first and second magazines in a predetermined order, and means connected to said last-mentioned advancing means and cooperative with said synchronizing means for transferring said pallets one-by-one to said magazine of said block-making machine, said transfer of respective pallets from said first and second magazines depending on said order.

9. A conveyor system for pallets on which are deposited blocks made in a block-making machine having a magazine, said pallets to be deposited in the service magazine of said block-making machine, said system comprising, in combination, a first pallet unloading channel, a second pallet unloading channel, each said channel including means for advancing pallets unloaded thereon, a magazine connected to each channel for receiving said pallets transmitted by each channel and storing said pallets, each said magazine connected to said channels storing a plurality of said pallets, said pallets being stacked one on top of the other in each said last-named magazine, an output conveyor for transmitting said pallets, transferring means connecting both said last-named magazines to said output conveyor for transferring the pallets in said last-named magazines to said output conveyor, said transferring means including means for engaging and advancing said pallets one-at-a-time out of a portion of each said magazine connected to its respective channel onto said output conveyor, and gate means cooperative with said portions of said last-named magazines permitting only one pallet at a time to pass to said output conveyor from each said magazine.

10. A conveyor system for pallets to be deposited in the service magazine of a block-making machine including a plurality of parallel input conveyors for transmitting said pallets, a magazine connected to each input conveyor for receiving and storing the pallets advanced by the associated input conveyor, said last-named magazines being progressively and successively displaced in the direction of movement of said pallets along said input conveyors a distance somewhat more than the length of a pallet, an output conveyor for removing said pallets to said magazine of said machine in a direction generally transverse to said input conveyors, means mounting said output conveyor so that said magazines connected to said input conveyors extend along the transverse dimension of said output conveyor, means connecting said last-named magazines to said output conveyor for advancing said pallets from said last-named magazines to said output conveyor along the longitudinal dimension of said output conveyor, and means connected to said output conveyor for transferring said pallets to said magazine of said block-making machine, said advancing means including means cooperative with said transferring means for synchronizing the movement of said pallets from each of said magazines connected to said input conveyors so that said pallets are advanced one-by-one to said magazine of said block-making machine.

11. A conveyor system for pallets which ultimately receive the blocks produced by a block-making machine, said pallets alone to be returned to the service magazine of said machine, said system comprising in combination, a pallet carrier, said pallets being removably disposed on said pallet carrier spaced in a plurality of vertically displaced positions, said carrier accommodating at least two rows of said vertically displaced pallets at each vertical level of said carrier, said rows of pallets being horizontally uniformly spaced and said carrier having a structure such that the pallets in said rows may be removed for pallet unloading purposes from said carrier by engagement with the under face of each pallet and vertical displacement of the carrier relative to the engaged pallets, said system also comprising at least two pallet unloading channel means, the number of said rows being equal to the number of said channel means, said channel means being herein designated as first pallet unloading channel means and second pallet unloading channel means, means mounting said first and second pallet unloading channel means, means mounting said first and second channel means with their receiving ends uniformly spaced to correspond to the spacing of the pallets in said rows of said vertical positions, said first channel means being formed, mounted and spaced at its pallet receiving end so as to interlink with said carrier and engage in pallet unloading relationship with the pallets on said carrier in its respective row at the channel unloading level and said second channel means being formed, mounted and spaced at its pallet receiving end so as to interlink with said carrier and engage in pallet-unloading relationship with said pallets on said carrier in its respective row at the channel unloading level whereby said channel means unload all the pallets at said one level in said last-named rows, each of said channel means including means for advancing pallets unloaded thereon, said pallets in said first and second channel means being advanced in generally parallel lines by said pallet unloading means, and means connected to said channel means for transferring the pallets received thereby to said magazine of said machine, said pallet transferring means including means cooperative with said pallets in said first and second channel means to synchronize the movement of said pallets for causing said transferred pallets to be deposited one at a time in said magazine of said machine.

12. A conveyor system for pallets which ultimately receive the blocks of a block-making machine, said system comprising in combination, a pallet carrier on which the pallets are removably disposed, spaced in a plurality of vertically displaced positions, said carrier accommodating at least two rows of said vertically displaced pallets at each vertical level, said rows of pallets being uniformly spaced and said carrier having a structure such that the pallets in said rows may be removed for pallet unloading purposes from said carrier by engagement with the under face of each pallet and vertical displacement of the carrier relative to the engaged pallet, said system also comprising at least two pallet unloading channel means, the number of said rows being equal to the number of said channel means, said channel means being herein designated as first pallet unloading channel means and second pallet unloading channel means, means mounting said first and second channel means with their receiving ends uniformly spaced to correspond to the spacing of the pallets in said rows of said vertical positions, said first channel means being formed, mounted, and spaced at its pallet receiving end so as to interlink with said carrier and engage in pallet unloading relationship with the pallets on said carrier in its respective row at the channel unloading level and said second channel means being formed, mounted and spaced at its pallet receiving end so as to interlink with said carrier and engage in pallet unloading relationship with said pallets on said carrier in its respective row at the channel unloading level whereby said channel means unload all the pallets at said one level in said last-named rows, each of said channel means including means for advancing pallets unloaded thereon, said pallets in said first and second rows being advanced in parallel lines by said pallet unloading means, and means connected to said channel means for removing the pallets advanced thereby.

References Cited in the file of this patent

UNITED STATES PATENTS

| | | |
|---|---|---|
| 1,425,556 | Tingwall et al. | Aug. 15, 1922 |
| 1,699,637 | Steele | Jan. 22, 1929 |
| 1,900,243 | Layer | Mar. 7, 1933 |
| 2,467,203 | Gelbman | Apr. 12, 1949 |
| 2,586,210 | Corwin | Feb. 19, 1952 |
| 2,640,579 | Schutt | June 2, 1953 |
| 2,675,139 | Mercier et al. | Apr. 13, 1954 |
| 2,692,058 | Straub | Oct. 19, 1954 |
| 2,692,418 | Besser | Oct. 26, 1954 |
| 2,698,698 | Smith et al. | Jan. 4, 1955 |